Oct. 5, 1937.   R. W. GLASNER   2,095,094
COMBINED FLUID PRESSURE CONTROLLED CLUTCH AND BRAKE
Filed July 25, 1935   2 Sheets-Sheet 1
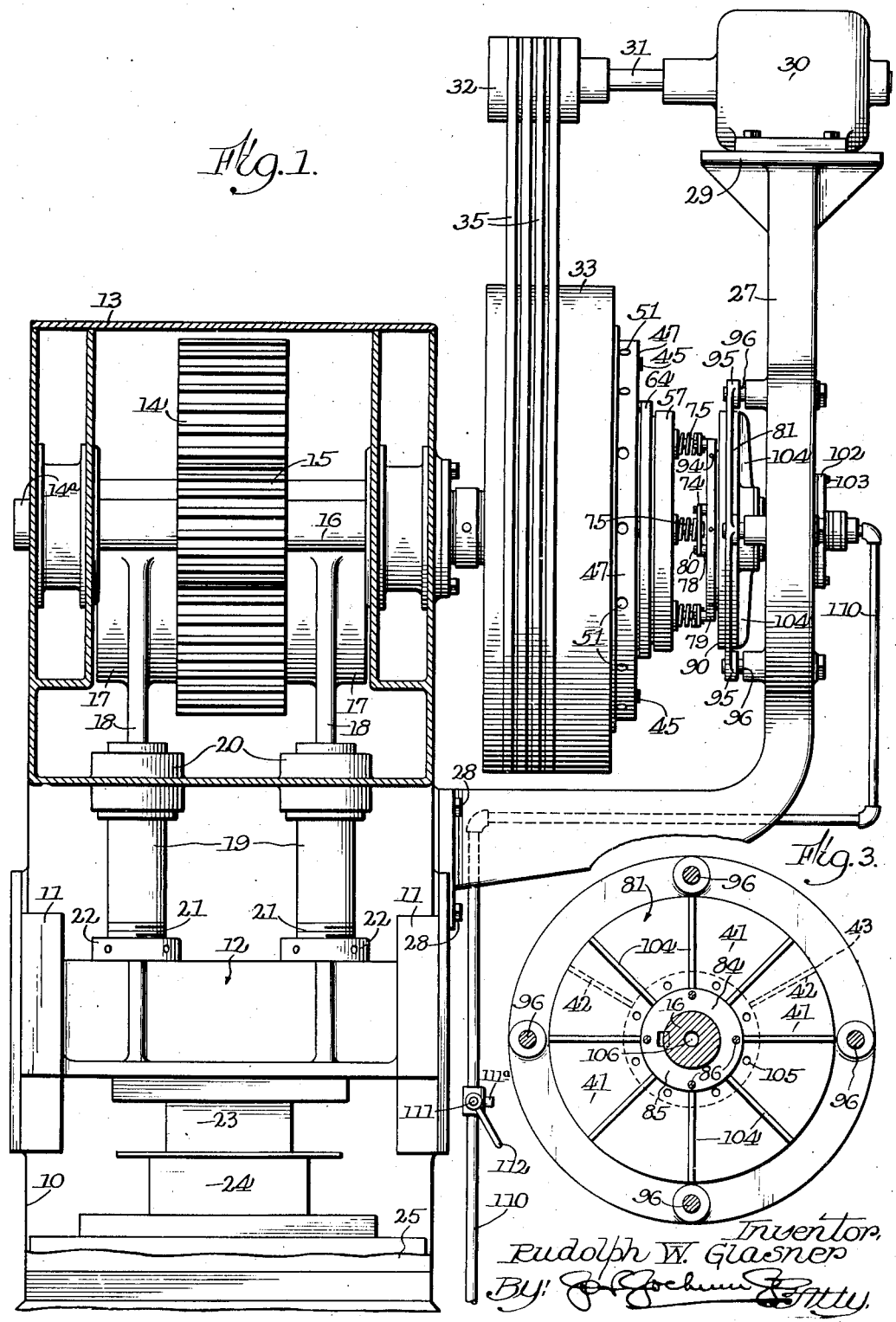

Oct. 5, 1937.  R. W. GLASNER  2,095,094
COMBINED FLUID PRESSURE CONTROLLED CLUTCH AND BRAKE
Filed July 25, 1935  2 Sheets-Sheet 2
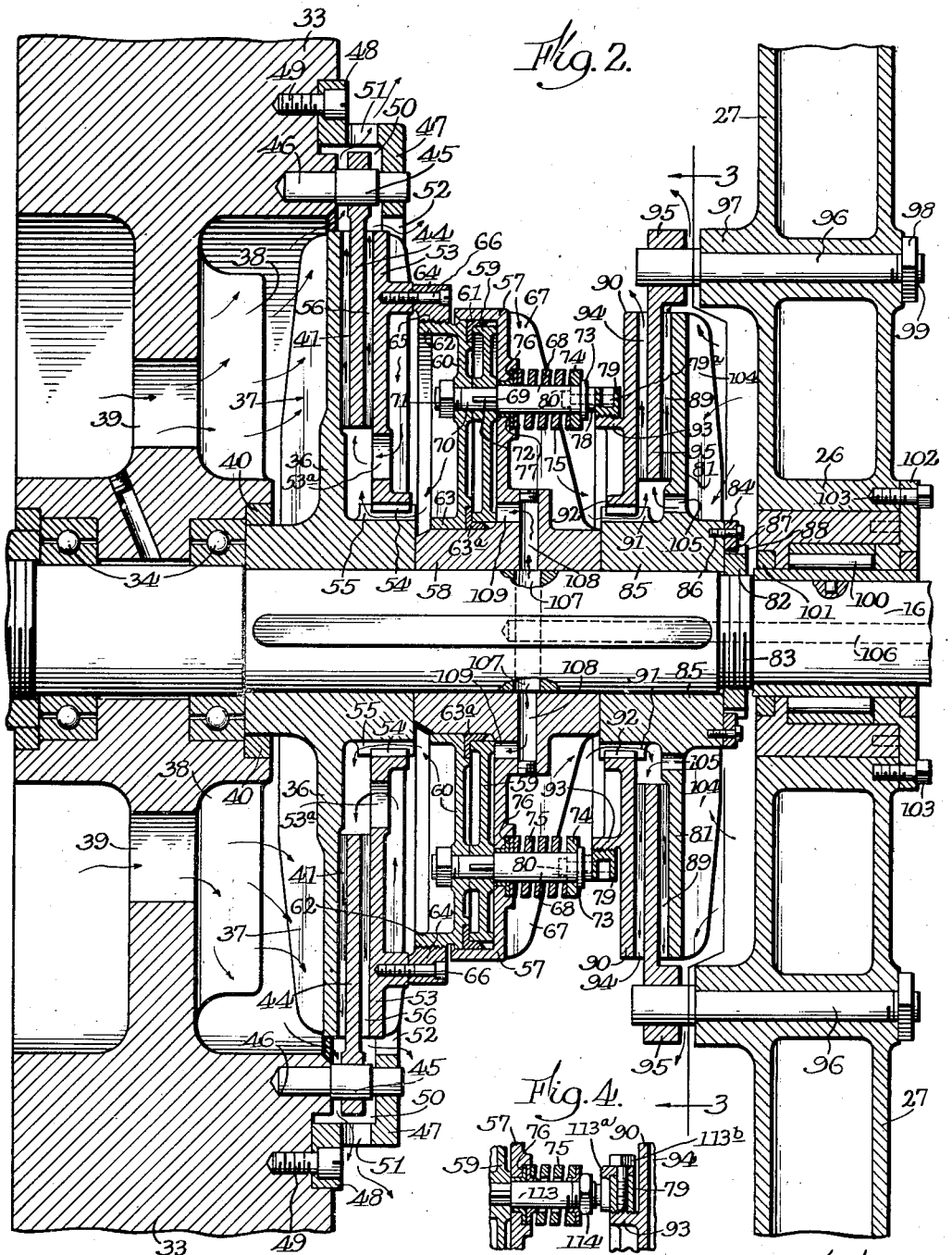
Inventor:
Rudolph W. Glasner
BY
Atty.

UNITED STATES PATENT OFFICE 2,095,094

COMBINED FLUID PRESSURE CONTROLLED CLUTCH AND BRAKE

Rudolph W. Glasner, Chicago, Ill.

Application July 25, 1935, Serial No. 32,996

9 Claims. (Cl. 192—18)

This invention relates to improvements in fluid pressure controlled clutch and brake, particularly adapted, though not necessarily limited, for use in presses, and one of the objects of the invention is to provide an improved structure of this character in which means are provided whereby the operator will be enabled to employ the clutch for accurate "inching" of the slide, for die setting.

A further object is to provide a combined clutch and brake of this character, the operation of which is such that when either the clutch or brake is rendered active, the other will be rendered inactive, thereby rendering it impossible to simultaneously render both of them active.

A further object is to provide in a device of this character improved means whereby the clutch will positively pull off the brake when the former is rendered active, and the brake will positively pull off the clutch when the brake is rendered active, so that only one part of the mechanism will be rendered active.

A further object is to provide improved means for creating and circulating air currents for cooling the parts.

A still further object is to provide an improved device of this character in which the clutch will have a very short movement, thereby assuring quick action, and at the same time eliminate jarring of the clutch.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view in elevation, of one form of press having a combined clutch and brake mechanism, constructed in accordance with the principles of this invention, applied thereto.

Figure 2 is a vertical, longitudinal, sectional view, on an enlarged scale, of the combined clutch and brake mechanism, and with portions of the press in section.

Figure 3 is a detail sectional view, taken on line 3—3, Figure 2, on a smaller scale.

Figure 4 is a detail view, partly in elevation and partly in section, of a form of adjustment for varying the tension of the brake spring whereby the tension of the spring may be controlled regardless of the adjustment of the brake element when the latter is adjusted to compensate wear.

In the drawings, the invention is shown as applied to a form of press in which the numeral 10 designates the frame of the press having guides 11 upon which a ram or slide 12 reciprocates. The numeral 13 designates a hollow crown in which there is provided a gear wheel 14 mounted upon a shaft 14ᵃ journaled in suitable bearings in the frame. This gear wheel is driven by a pinion 15 mounted upon a shaft 16, and eccentric members are connected with the gear 14, and with which eccentrics eccentric straps 17 co-operate. These eccentric straps are connected by means of arms 18 to members 19, which latter reciprocate through suitable fluid tight bearings 20 in the bottom of the hollow crown, and are adjustably secured by means of the threads 21 and nuts or collars 22 with the slide. Carried by the slide is a die 23 which co-operates with a die 24 mounted upon the bed 25 of the press.

All of the above referred to parts may be of any desired construction, but are preferably of the construction shown in my United States Patent Number 1,977,549, issued October 16, 1934.

The shaft 16 constitutes the main driven shaft and is journaled in suitable bearings in the frame of the press and also in a bearing 26 in a bracket 27, which is secured in any suitable manner, such as at 28, to the frame of the press, and at the upper extremity of the bracket, which latter may extend for any desired height with respect to the top of the press frame, may be arranged a platform or support 29 upon which is mounted a suitable motor 30 having a shaft 31 to which a pulley 32 is secured.

The numeral 33 designates a fly wheel constituting a driving element which carries a clutch member hereinafter described, and is mounted upon the shaft 16 for free rotation with respect thereto, roller bearings 34, of any desired type being preferably arranged between the fly wheel 33 and the shaft 16. The fly wheel is continuously rotated by means of drive belts 35 which pass over the pulley 32 and also over the fly wheel.

The numeral 36 designates a clutch member which is secured to the shaft 16 for rotation therewith, in any suitable manner, such as by means of being keyed thereto or by any other suitable fastening device, and on the outside lateral face of the clutch member 36 radial ribs or fins 37 are provided which co-operate with ribs or fins 38 on the adjacent face of the fly wheel 33, openings 39 being provided in the web or body of the fly wheel in proximity to the fins 37 and 38.

These fins terminate short of each other and may be of any desired size and configuration, and any number may be provided, the purpose of the fins being to create air currents for a purpose to be set forth. As the fly wheel rotates independently with respect to the clutch member 36 or as the clutch member 36 rotates with the fly wheel, air currents will be drawn through the openings 39 and circulated by and between the fins 37 and 38.

A seal 40 in the form of packing or sealing glands, may be provided to form an oil seal between the hub of the clutch member 36 and the hub of the fly wheel 33.

Secured to the other face of the clutch member 37 are friction creating elements 41 which may be constructed of any suitable material, and these elements 41 are preferably in the form of segments, the proximate edges (see Figure 3) 42 of which terminate short of each other to provide grooves or passages 43 therebetween so as to permit of the circulation of air currents through the passages 42.

Supported by the fly wheel 33 is a disc or annular member 44 held in position by means of suitable pins 45, any number of which may be provided, and which pass through portions of the disc 44 and enter the fly wheel 33 as at 46. The other ends of the pins 45 are mounted in bearings in a plate or member 47 which is provided with a flange 48 that contacts with or may be recessed into the adjacent face of the fly wheel 33 and is secured or anchored in position by means of suitable securing or anchoring bolts 49. The member 47 is so shaped as to form a space 50 between the face of the fly wheel 33 and the adjacent face of the member 47, and in which space the disc 44 is arranged, the disc being mounted so as to "float" so to speak, upon the pins 45.

Openings 51 are provided in the member 47 that communicate with the space 50, and additional openings 52 may be provided in the plate 47 so as to permit air currents to be discharged from the space 50 and to create a circulation of the air currents.

Arranged on the other side of the disc 44 is another clutch member 53 which is adapted to be moved through the opening 52 toward and away from the disc 44, and this clutch member is held against rotation with respect to the clutch member 36 in any suitable manner, preferably by means of a portion 54 sliding in a groove or guide 55 on the hub of the clutch member 36. Friction creating elements 56 are secured to the face of the clutch member 53, which is adjacent the disc 44 and these friction elements 56 may be similar to the friction elements 41 and formed in segments or sections with their proximate edges spaced to form air passages or grooves therebetween.

The numeral 57 designates a cylinder which is provided with a hub 58 that is keyed to the shaft 16 for rotation therewith and for rotation with the clutch member 36. Within the cylinder 57 is arranged a piston 59 and a cap or closure member 60 is provided for the cylinder. A sealing ring 61 may also be provided for the piston. The cap or closure member is provided with a portion 62 having external threads and a hub 63 which is journaled upon the hub 58 of the cylinder 57. An annular ring 64 provided with internal screw threads 65 is threaded upon the portion 62 of the member 60, and this annular member 64 is fastened to the clutch member 53 in any suitable manner, such as by means of screws or bolts 66, so that when the member 60 which is connected with the piston 59 for reciprocation therewith, and which is reciprocable with respect to the cylinder 57, is moved laterally the clutch member 53 will be moved toward or away from the disc 44, thereby causing the friction elements 56 carried thereby and the friction elements 41 carried by the clutch member 36 to grip the disc 44, the disc moving along the pins 45 under such movement of the piston 59 and the member 60.

In order to take up the wear of the friction creating elements 41, the adjustable ring or element 64 is provided.

Fins or blades 67 are provided on the outside of the cylinder 57 to create air currents.

The numeral 68 designates a pin or member which is provided with a shoulder 69 forming a reduced portion 70 which passes through the piston 59 and the member 60, these parts being secured together by means of a nut 71 screwed on the end of the pin 68, and which nut cooperates with the shoulder 69 to clamp the piston 59 and the member 60 for movement together. The pin 68, any number of which may be provided, is secured to the piston 59 in any suitable manner, such as by means of a key or fastening device 72. Each of the pins 68 is provided with a head 73 beneath which a plate 74 is arranged that abuts the head, and 75 designates a coiled spring of a predetermined tension which encompasses the pin 68, one end resting against the plate 64 and the other end resting against a washer 76 that abuts the end of the cylinder 57, packing material 77 being provided to form a fluid tight joint.

The head 73 of each of the pins rests against an abutment 78 that is carried by a ring 79, and 80 designates bolts which pass through portions of the plate 74 (see particularly Figure 1) and engage the rings 79 for securing or anchoring the plates 74 in position.

Mounted upon the shaft 16 is a brake member 81 and this member 81 may be secured to the shaft for rotation therewith in any suitable manner, such as by means of a collar 82 threaded upon the portion 83 of the shaft, and 84 designates an annular member which is fastened to the hub 85 of the brake member 81 by suitable fastening screws 86, the annular member 84 and the collar 82 being provided with interengaging portions 87—88 which will hold the brake member 81 for rotation with the shaft 16, but will permit of the brake member 81 being adjusted lengthwise of the axis of the shaft 16, for a purpose to be set forth, when desired. The brake member 81 is provided with friction engaging elements 89 similar to the elements 41, and these elements 89 are spaced from each other so as to form air passages therebetween. A brake member 90 is mounted upon the hub 85 of the brake member 81 for rotation therewith, but for longitudinal adjustment with respect thereto, the elements 85 and 90 being provided respectively with interengaging portions 91—92 movable one with respect to the other in directions lengthwise of the hub 85. The brake element 90 is provided with a hub 93 which is provided with external screw threads upon which the ring 79 is mounted, and this ring 79 is provided with openings 79ª extending through the periphery thereof to permit of the insertion of a tool or implement whereby the ring or member 79 may be rotatably adjusted with respect to the brake element 90, so that when the friction elements 94 and 89 become worn, the elements 81 and 90 may be adjusted with respect to each other so as to take up the wear by rotating the ring 79 and adjusting the same upon the hub 93 of the brake element 90.

Supported by the bracket 27 is a disc or annular member 95 which projects between the brake elements 81 and 90, so that the friction engaging elements 89 and 94 will bind or grip the faces of the disc 95 to apply the brake, and the disc or member 95 is floatingly supported by means of a pin 96 mounted in a bearing 97 in the bracket 27, and which pin is held in position by means of a nut or collar 98 engaging the screw threaded extremity 99 thereof.

The disc 95 is mounted so as to "float" so to speak so that it will move laterally and in directions lengthwise of the axes of the pins 96 by the adjustment of the brake members 81 and 90, but will be held against rotation by means of the pins 96 engaging the brackets 27, so that when the brake members 81 and 90 are forced toward each other, that is when the brake members are rendered active to grip the disc 95, the brake will be applied.

The portion of the shaft 16 which is journaled in the bracket 27 may, if desired, be provided with roller bearings 100 and packing 101 forms an oil seal. The cap plate 102 may be removably secured in position by means of the bolts 103.

Fins or wings 104 may be provided on the outer face of the brake member 81 so as to create air currents and the brake member 81 may be provided with openings 105 through which the air currents may pass so as to be discharged through the passages between the adjacent friction engagement elements 89 and 94 on the opposite faces of the disc 95.

The shaft 16 is provided with an air passage 106 therein which has outlet openings 107 that communicate with openings 108 in the hub 58 of the cylinder member 57, and the openings 108 have communication with openings 109 in the bottom of the cylinder so that air or fluid under pressure being forced through the pipe or passage 106 will flow through the passage 107 into the passage 108, through the openings 109 to be discharged into the cylinder 57 on the bottom of the piston 59. This fluid under pressure will cause the piston 59 to be moved in the cylinder and with it the cap member 60 of the cylinder, which latter, through the medium of the ring 84 will force the clutch member 53 against the disc 44. The disc in turn will be forced against the friction members 41 on the face of the clutch member 36 and thereby lock the shaft 16 with the fly wheel 33 for rotation therewith. At the same time that this fluid pressure operates to render the clutch active, the member 90 of the brake will be moved away from the disc 95 and thereby render the brake inactive. This will be accomplished by reason of the fact that the pins 68 connect the piston 59 and the member 60 with the brake member 90. As the clutch member 53 is being forced into active engagement with the disc 44, the pins 68 will positively draw the brake member 90 into an inactive position, and at the same time the springs 75 will be compressed. As soon as the air pressure is relieved, the energy thus stored in the springs 75 will act to force the brake member 90 into contact with the disc 95, and the disc 95 into contact with the friction engaging elements 89 on the brake member 81 and thereby apply the brake.

It will therefore be manifest that when the clutch member is applied to the fly wheel 33, the clutch member 53 will through its movement positively draw off or render inactive the brake member 90. Similarly, when the brake member 90 is forced towards the disc 95 to render the brake active, under the stress of the spring 75, the pins 68 will positively withdraw or move the clutch member 53 into an inactive position, with the result that the application of either the brake or the clutch will render the other inactive and it will be impossible to simultaneously apply both the brake and the clutch.

Fluid pressure is supplied to the passage 106 from any suitable source and in any suitable manner, such as by means of a pipe 110 which leads from a suitable source of supply of compressed fluid, and in the pipe 110 may be arranged a valve 111 having an operating handle 112 by means of which the fluid supply may be controlled.

In order to provide a means whereby the tension of the spring 75 may be varied, regardless of the adjustment of the brake or clutch element, when the latter is adjusted to compensate wear, and so that such adjustment of these elements will not influence the tension of the spring, there is shown in Figure 4 a pin or member 113 corresponding to the pin or member 68 shown in Figure 2. The end of this member 113 is provided with threads to receive a nut or collar 114 which contacts the plate or member 74 against which the end of the spring 75 rests.

It will be manifest that by adjusting this nut or collar 114 on the pin 113, the tension of the spring may be tightened or loosened according to the direction of adjustment of the nut. This adjustment will be effected independently of the adjustment of the ring 79 or the ring or element 64 when the latter are adjusted, so as to compensate or take up wear between the co-acting faces of the clutch and brake elements.

The pin 113 may be provided with a flanged head 113ª which rests against the ring 79 and fastening members such as bolts or pins 113ᵇ pass through openings in the head 113ª and into openings in the ring 79, the ring being secured on to the threaded hub 93.

With this improved construction it will be manifest that the fluid clutch has a very short travel which assures quick action and will eliminate all jarring of the clutch, and furthermore, it will enable the operator to use the clutch for accurate "inching" for die setting.

It will also be manifest that adjustments are provided for taking up the wear on the friction creating elements of both the clutch and the brake, and by the provision of the fins or blades on the rotating parts which may or may not co-operate with fins on other parts of the mechanism, will create circulation of air currents which will maintain all of the parts cool.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination, a driving element, a driven element, clutch mechanism between the driving and driven elements for operatively connecting them, brake mechanism for the said driven element, an operative connection between the clutch and brake mechanisms, said connection embodying means whereby said clutch and brake will be always maintained against becoming simultaneously active, fluid pressure controlled means for rendering said clutch active at will, means embodying a plurality of springs for rendering said brake active and against the stress of which spring means the brake is rendered inactive as the clutch is rendered active and means for simultaneously and uniformly varying the stress of said springs.

2. In combination, a driving element, a driven element, a clutch for operatively connecting said elements, a brake for said driven element, fluid pressure means for controlling said clutch, means for rendering said brake active, means whereby when either the clutch or brake is rendered active the other will be rendered inactive, means for controlling at will the said fluid pressure means, and means individual to the clutch and brake elements for separately compensating wear in the parts of either, independently of the other, the last recited means being accessible and adjustable while the remaining parts of the structure remain intact.

3. In combination, a driving element, a driven element, a clutch between the driving and driven elements, a brake for the driven element, fluid pressure means for controlling the clutch and embodying a relatively movable cylinder and piston one of which is fixed and the other of which is connected with one of the clutch members, means for controlling said fluid pressure means at will, a rigid connection between the movable one of said cylinder and piston elements and one of the said brake members, whereby when either the clutch or brake is rendered active the other will be rendered inactive, means embodying a plurality of elements individual to the brake mechanism for rendering the latter active when the said clutch is rendered inactive and in which elements energy is stored as the said clutch is rendered active, means for simultaneously and uniformly varying the stress of such elements, and means for compensating wear between the parts of the clutch, the last recited means embodying an adjustable connection between the clutch member and the movable one of the cylinder and piston elements.

4. In combination, a driving element, a driven element, clutch mechanism between the driving and driven elements for operatively connecting them, brake mechanism for the said driven element, an operative connection between the clutch and brake mechanisms, said connection embodying means whereby said clutch and brake will be always maintained against becoming simultaneously active, said connection also embodying means for maintaining one of the clutch and brake elements in a fixed position with respect to each other, fluid pressure controlled means for rendering said clutch active at will, means embodying a plurality of springs for rendering said brake active and against the stress of which springs the brake is rendered inactive as the clutch is rendered active, and means for simultaneously and uniformly varying the tension of said springs independently with respect to the position of the said clutch and brake element with respect to each other.

5. In combination, a driving element, a driven element, clutch mechanism between the driving and driven elements for operatively connecting them, brake mechanism for said driven element, an operative connection between the clutch and brake mechanisms, said connection embodying means whereby said clutch and brake will be always maintained against becoming simultaneously active and for maintaining the connected clutch and brake elements in a fixed position with respect to each other, means forming a part of such connection for varying the fixed position of the connected brake and clutch elements, fluid pressure controlled means for rendering said clutch active, means embodying a plurality of springs for rendering said brake active and against the stress of which springs the brake is rendered inactive as the clutch is rendered active, and means for simultaneously and uniformly varying the tension of said springs independently with respect to the means for varying the fixed position of the said brake and clutch elements.

6. A clutch and brake control for power transmission embodying a driving member, a driven member, a friction clutch for operatively connecting said members, a friction brake for said driven member, fluid pressure means for controlling said clutch, said clutch and brake each embodying a bodily movable element, said elements being spaced from each other, a connecting member between said elements, means adjustably securing said connecting member to each of said elements whereby the space between said elements may be varied, and a plurality of springs for rendering said brake active and said clutch inactive and against the stress of which springs the brake is rendered inactive when the clutch is rendered active, the said adjustable connection between the said connecting member and the brake element also serving as a means for simultaneously and uniformly varying the tension of said springs.

7. A clutch and brake control for power transmission embodying a driving member, a driven member, a friction clutch for operatively connecting said members, a friction brake for said driven member, fluid pressure means for controlling said clutch, said clutch and brake each embodying a shiftable element, said elements being laterally spaced from each other, a member having threaded connection with each of said elements, a rigid connection between the last said members for connecting and maintaining said elements spaced, and a spring against the stress of which said brake element is moved when said clutch element is rendered active, the stress of said spring rendering the brake element active when the clutch element is rendered inactive, the said member between the said connecting member and the said brake element also serving as a means to vary the tension of said spring.

8. A clutch and brake control for power transmission embodying a driving member, a driven member, a friction clutch for operatively connecting said members, a friction brake for said driven member, fluid pressure means for controlling said clutch, said clutch and brake each embodying a shiftable element, said elements being laterally spaced from each other, a member having threaded connection with each of said elements, a rigid connection between the last said members for connecting and maintaining said elements spaced, and a plurality of springs against the stress of which said brake element is moved when said clutch element is rendered active, the stress of said springs rendering the brake element active when the clutch element is rendered inactive, the said member disposed between the connecting member and the said brake element also serving as a means to simultaneously and uniformly vary the stress of said springs.

9. A combined clutch and brake for power transmission embodying a driving member, a driven member, a clutch for connecting said members, a brake for said driven member, fluid pressure means for controlling said clutch and embodying a cylinder and piston operable therein, a hub carrying said cylinder and mounted upon said driven member, there being a fluid supply passage through said driven member and said hub directly into said cylinder, and means operating to render said brake inactive when said clutch is rendered active.

RUDOLPH W. GLASNER.